UNITED STATES PATENT OFFICE.

FRANCIS J. OBERT, JR., OF READING, PENNSYLVANIA.

IMPROVEMENT IN COMPOSITIONS FOR REMOVING INCRUSTATIONS FROM STEAM-BOILERS.

Specification forming part of Letters Patent No. 209,186, dated October 22, 1878; application filed December 24, 1877.

*To all whom it may concern:*

Be it known that I, FRANCIS J. OBERT, Jr., of Reading, in the State of Pennsylvania, have invented an Improved Composition for Removing Incrustation from Boilers, of which the following is a specification:

Before my invention a composition for cleaning or removing scale from boilers had been made use of, in which slippery-elm bark, an extract of tannin, such as hemlock, and ammonia had been mixed with molasses.

By extensive experiment and practical tests I have discovered that the compound formed in the following manner and of the ingredients set forth possesses superior properties for removing incrustation without injury to the iron:

The proportions I use are about nine pounds of slippery-elm bark to about five pounds of borax, and mix the same into about forty to forty-five gallons of water, and boil the same about six hours. I then add about one hundred and twenty-five pounds of extract of hemlock-bark, about two and a half pounds of aqua-ammonia, and about ten pounds of sugar, or about eight pounds of black molasses. These ingredients are thoroughly mixed and the same is in a condition for use.

The quantity introduced into a boiler is varied according to the condition of the boiler, and the character of the water made use of in the same. After the scale is removed a small quantity at a time should be introduced at regular intervals.

I find in practice that the borax is a very essential ingredient in my compound, as the boracic acid combines with and neutralizes the lime that is usually present in water containing impurities, and prevents the deposit of the lime upon the boiler.

I claim as my invention—

The compound herein described for removing and preventing incrustation in boilers, consisting of borax, slippery-elm bark, extract of hemlock-bark, or equivalent astringent, aqua-ammonia, and saccharine material, in about the proportion and substantially as set forth.

Signed by me this 14th day of December, A. D. 1877.

FRANCIS J. OBERT, JR.

Witnesses:
 A. K. STAUFFER,
 WM. J. KERNAN.